Jan. 26, 1926.                    E. G. ROCHE                    1,570,645
                                     BOLT
                              Filed Feb. 12, 1923

INVENTOR.
Edward G. Roche
BY
M. C. Frank
ATTORNEY

Patented Jan. 26, 1926.

1,570,645

UNITED STATES PATENT OFFICE.

EDWARD G. ROCHE, OF SAN LEANDRO, CALIFORNIA.

BOLT.

Application filed February 12, 1923. Serial No. 618,501.

*To all whom it may concern:*

Be it known that I, EDWARD G. ROCHE, a citizen of the United States, residing at San Leandro, in the county of Alameda and State of California, have invented certain new and useful Improvements in Bolts, of which the following is a specification.

This invention relates in general to bolts for fastening purposes, and in particular to bolts for securing the demountable tire-carrying rim to an automobile wheel.

The objects of the invention are to facilitate the use of such a bolt; to prevent its being pushed out of position in assembling the parts to be connected thereby; to prevent the turning of the body of the bolt in tightening and loosening the nut; and such other purposes to which the bolt may be applicable.

In carrying out my invention, I construct the bolt with a laterally projecting lug upon one side thereof in proximity to the head of the bolt, with a predetermined space between the said head and the adjacent end of the lug. The lug is preferably, in cross-section, substantially of the shape of an isosceles triangle, the body of the bolt being the base of the triangle.

My bolt is of special utility in securing demountable tire-carrying rims to automobile wheels, and I will now describe it with reference to such use. Other uses of the bolt will be readily apparent and suggest themselves to the mechanic from such description.

In the accompanying sheet of drawings, I have illustrated my bolt and its use in connection with an automobile wheel.

Figure 1:
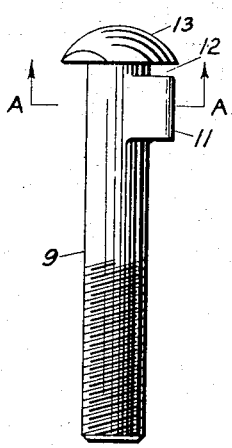
Figure 1 is a side elevation of the bolt, showing the lateral lug and the space between the lug and the head of the bolt, the nut being omitted.

Referring to the drawing and the figures thereof:—The automobile wheel represented by the numeral 1, is provided with the usual felloe 2, upon which is supported the demountable rim 3, carrying the tire 4. The rim 3 rests directly upon the supporting flange 5 of the felloe on the inner side of the wheel, and indirectly upon the flange 6 on the outer side of the wheel.

7 is a wedge member interposed between the flange 6 and the rim 3, serving to center the rim 3 upon the felloe. The wedge members, of which there may be any desired number, are provided with ears 8, extending toward the center of the wheel for engaging the bolts. The tendency at the present time is to make the members 7 integral with the rim 3, thereby increasing the need of a bolt capable of preventing its rotation and at the same time preventing its longitudinal displacement when the parts are secured together.

Heretofore it has been customary to use ordinary "carriage bolts" for securing the demountable rim to the felloe, but it has been found that when such bolts were positioned in the felloe and the demountable rim slipped on them and into place, that the bolts in most instances were pushed back and out of engagement, and that the operator then had to reach between the wheel spokes or around the tire to replace the bolts in position or hold them there, with the risk of smearing or soiling his clothes.

Figure 4:
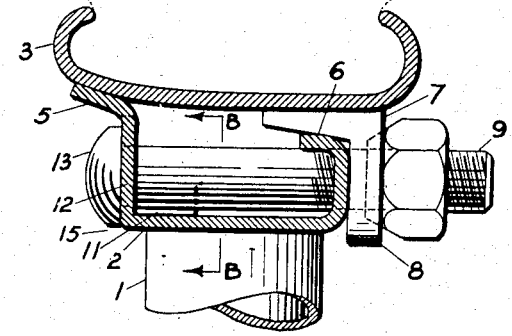
Figure 4 is a longitudinal section along the line B—B of Fig. 3, showing part of the automobile permanent rim or felloe, with one of my bolts in place.
Figure 5:
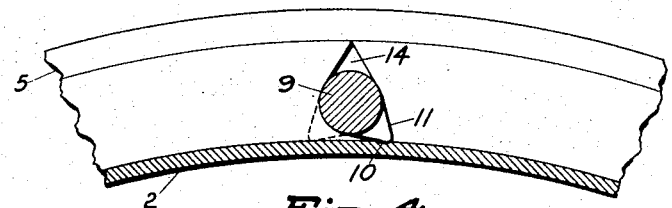
Figure 5 is a fragmentary elevation of an automobile wheel from the outer side, and shows the centering and fastening members by which the demountable rim is centered and secured.

With my bolts 9 there is no such casualty possible, because the bolt is provided with a lateral lug 11, adapted to pass through a correspondingly shaped hole 14 (Fig. 4) in the flange 5 thereof. After insertion the bolt is partially rotated and the flange 5 is thereby engaged between the lug 11 and the head 13 of the bolt, in the space 12 between those parts. Thus the bolt is firmly held against longitudinal movement with respect to flange 5. The demountable rim may then be slipped on with the ears 8 encircling the bolts, and the nuts put on and tightened. The tightening of the nuts cause the bolts 9 to turn until the lugs 11 contact the base of the felloe member as at 10, Fig. 4, and the bolt is thereby held against further rotation. In loosening the nuts, the bolts turn in the opposite direction until the lugs 11 contact the base on the other side, as shown in dotted lines also in Fig. 4.

Figure 2:
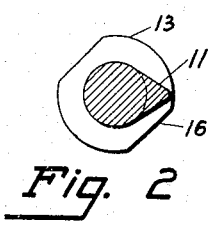
Figure 2 is a cross-section of the bolt along the line A—A of Fig. 1, looking in the direction of the arrows.
Figure 3:
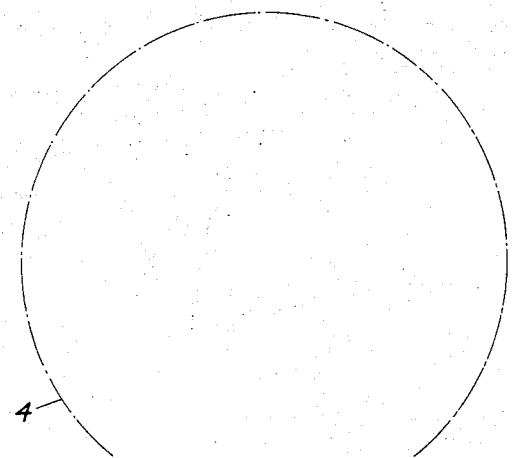
Figure 3 is a cross-section of a portion of an automobile wheel, showing a tire and a demountable rim connected to the permanent rim or felloe of the wheel by means of one of my bolts, of which I use a plurality.

In cases where there is but a narrow margin between the bolt hole and the edge of the felloe as seen at 15 in Fig. 3, the bolt head may be flattened as at 16 in Fig. 2, so that when the bolt is in its final holding position, the flattened portion of the head will register at the edge of the rounded portion of the felloe, thus presenting a neat appearance.

While I have thus described the preferred form of my invention, I wish to have it understood that slight changes may be made within the scope of the claims hereto attached without affecting the spirit of the invention, therefore, what I claim as new and desire to secure by patent protection thereon in the United States, is the following:

1. In combination with a supporting flange provided with an opening therethrough, a straight bolt consisting of a head and a round body and having on the latter a triangular-shaped projecting lug spaced from said head a distance substantially equal to the thickness of said supporting flange, the opening in said flange being in size and shape substantially equal to the cross-section through the bolt and lug to permit the passage of the bolt and lug through the opening whereby the said head may engage one side of the flange and the lug the other side when the bolt is turned, thereby forming a lock to prevent displacement of said bolt relative to said flange.

2. A bolt, comprising a head and body, the body thereof provided with a lateral lug spaced from the head a predetermined distance, a support therefor having an opening of the size and shape of the cross-section through the body and lug, the lug adapted to be turned out of registry with the said opening in said support after insertion, the said lug preventing the bolt from being backed out of engagement with said support, and said lug further adapted to engage the base of the support to prevent rotation of the bolt.

In testimony whereof I affix my signature.

EDWARD G. ROCHE.